Dec. 27, 1960   J. L. HILLMAN ET AL   2,966,668
PRESSURE SWITCH

Filed May 24, 1957   4 Sheets-Sheet 1

INVENTORS
JERRY L. HILLMAN
DONALD R. RISTER

BY
ATTORNEY

Dec. 27, 1960    J. L. HILLMAN ET AL    2,966,668
PRESSURE SWITCH

Filed May 24, 1957    4 Sheets-Sheet 2

INVENTORS
JERRY L. HILLMAN
DONALD R. RISTER

BY
ATTORNEY

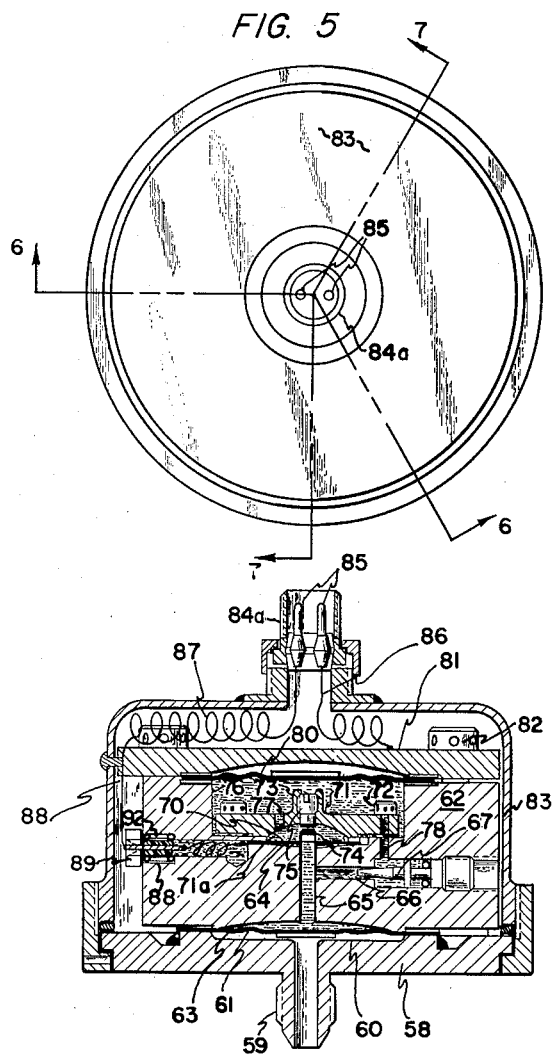

Dec. 27, 1960    J. L. HILLMAN ET AL    2,966,668
PRESSURE SWITCH
Filed May 24, 1957    4 Sheets-Sheet 4

INVENTORS
JERRY L. HILLMAN
DONALD R. RISTER
BY
ATTORNEY

United States Patent Office 2,966,668
Patented Dec. 27, 1960

2,966,668

PRESSURE SWITCH

Jerry L. Hillman, Northridge, and Donald R. Rister, San Dimas, Calif., assignors to Aerojet-General Corporation, Azusa, Calif., a corporation of Ohio Filed May 24, 1957, Ser. No. 661,541

8 Claims. (Cl. 340—240)

The present invention relates to a device for indicating loss of pressure at a rate in excess of a predetermined rate.

The device of this invention is specifically designed for use in liquid fuel rocket engines although not necessarily restricted to such use, the following specification will describe the invention with reference to liquid rocket engines by way of illustration only, but not of limitation.

In a liquid fuel rocket engine, in which propellant is pumped into a combustion chamber and burned therein under controlled conditions of carefully metered flow of propellant to rate of combustion, the danger of detonation of the propellant is a constant hazard should combustion cease for any reason while propellant continues to be pumped into the chamber and be ignited, for instance, by incandescent parts of the combustion chamber or the inopportune operation of means initiating combustion.

Under these conditions, since the amount of propellant in the combustion chamber would generate excessive pressure, the propellant would detonate, destroying the engine and probably the vehicle on which it is mounted since it is in fact an explosive which can only be burnt steadily if the amount introduced into the combustion chamber per instant of time is insufficient to raise the pressure in the chamber sufficiently to cause detonation.

It is essential therefore to cut off the flow of propellant to the combustion chamber instantaneously if the pressure in the combustion chamber falls abruptly, but it is not required to cut off the flow if the pressure falls at a rate to be expected during normal functioning of the engine since the pressure in a combustion chamber is never absolutely constant, or while the engine is coming up to full thrust due to normal starting transients.

It is an object of the invention to provide a device which will give a signal, or directly operate a control, on the occurrence of a sudden regression pressure in a system and which may be adjusted to operate on a predetermined rate of regression.

Another object of the invention is to provide a device of the kind above referred to which will not be operated by fluctuation in pressure within a range causing recessions at a rate less than that which will cause the device to operate, thus enabling the device to be used in systems in which continuous fluctuations are present in normal operation within a given range of rate of regression but in which regression at a rate higher than that for which the device is set will indicate a serious malfunction of the system.

With these and other objects in view the invention comprises a body structure containing chambers interconnected by passages, fluid retained therein by a pair of flexible diaphragms across chambers in opposite faces of the body structure and one of which is subjected to the pressure to be monitored. The fluctuation of the diaphragm subject to pressure causes flow of fluid which is controlled by valve means determining the direction and rate of fluid flow into and out of said chambers and through said passages. A third diaphragm or plate is mounted in a chamber in the body and a pair of contacts is provided, at least one of which is mounted on one of said diaphragms, and which abut each other to maintain an electrical circuit so long as the diaphragm-mounted contact is not moved away from the other contact consequent on the movement of the diaphragm caused by a more rapid regressive movement of the diaphragm, subjected to pressure causing a more rapid regressive flow of fluid than permitted by the setting of the valve means; the interruption of the electrical circuit by the separation of the contacts being effective to give a signal denoting said excessive rate of regression of pressure in the system, or to operate means to remedy the condition to prevent danger from said condition, or to effect any of such actions.

In the drawings:

Fig. 5 is a plan view of a modified form of the invention;

Fig. 6 is a section on the line 6—6 of Fig. 5;

Figure 1:
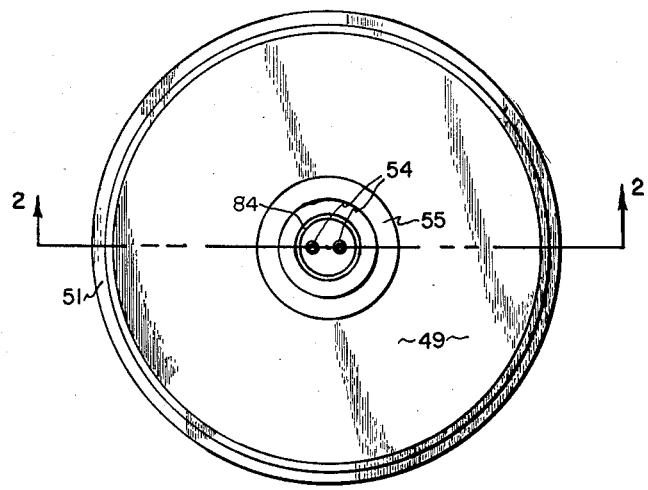
Fig. 1 is a plan view of one embodiment of the switch of this invention.

Referring now to Figs. 1 through 4 of the drawings, the numeral 10 indicates a base member made of corrosion-resistant metal and provided with a union 11 for connection to a pressure line (not shown) to the combustion chamber of a rocket motor.

A short length of tubing 12 is screwed into the internally threaded union 11 and is formed with a restricted orifice 13 to damp out high frequency transients. Around the opening of union 11 into the upper surface of base 10 is formed a recess 14 in the base and across the recess is welded a first corrugated metal diaphragm 15 stiffened by a backing plate 16. A stud forming one member 17 of an electrical switch is secured to the center of diaphragm 15. A first spaced member 18 is positioned over diaphragm 15 and an annular gasket 19 is positioned between the edge of the diaphragm 15 and spacer member 18 to afford a pressure-tight seal. A center hole 20 is provided in plate 18 to receive the contact 17 and a second contact 26 engaging with contact 17 to which reference will be made later. A recess 21 in the lower surface of member 18 is provided above the diaphragm 15 to enable it to deflect upwardly. An upstanding rim 22 is formed around the upper surface of plate 18 and a second corrugated diaphragm 23 thinner than diaphragm 15 is clamped against rim 22 by a second spacer member 18a and acts as a low rate spring providing accuracy and ease in calibration. The second diaphragm 23 is mounted in a recess 25 formed in member 18a co-axial with the recess 21 and is provided with a central backing plate 24 carrying the second member 26 of the electrical switch. The second recess 25 is made liquid tight by a sealing ring 27, and is filled with silicone oil. A central vertical bore 28 extends upwardly from recess 25 and a bore 29 intersecting bore 28 is provided with a check valve generally indicated at 30. The check valve 30 comprises a ball 31 loaded by a spring 32 under pressure of a threaded adjustment plug 33 provided with an O ring packing 34. Plug 33 is mounted in a threaded bore 35 and may be adjusted from the outside of the body member. A vertical passage 36 from the bore 29 from behind ball 31 opens to the bottom of a recess 37 in the upper surface of member 18a.

The bore 29 on the opposite side of vertical bore 28 to valve 30 is controlled by a metering valve generally indicated at 39. The metering valve comprises a needle 40 projecting into bore 29 and carried by a threaded adjusting plug 41 mounted in a threaded bore 42 and provided with an O ring packing 42a. A passage 43 connects bore 29 and the bottom of the recess 37 formed in upper surface of the body member 18a. A third corrugated diaphragm 44 is clamped over recess 37 by a clamping ring 45, said ring being provided with an upwardly bowed recess to provide for movement of diaphragm 44. A sealing ring 46 is placed between the edge of diaphragm 44 and clamping ring 45. The body of silicone oil referred to as occupying the recess above the second diaphragm 23 also fills the upper recess 37 and all spaces and passages between said two recesses. The clamping ring 45 is drawn against the upper diaphragm 44 and also clamps body members 18 and 18a and diaphragms 15 and 23 of the assembly together by bolts 47 extending through holes in members 18 and 18a and into threaded bores in the base of the body 10. A housing is thus established for the components of the switch. A cover 49 is provided to extend over the switch assembly and the depending skirt 50 thereof is threaded to engage with a retaining ring 51 having an inwardly extending bottom flange 52 engaging with an outward extending flange 53 of the base 10.

Two electrical contacts 54 are held in a receptacle mounted on a flanged tubular socket member 55 welded to the top of cover 50, a lead 56 from one contact being grounded on the base 10 and the other lead 57 being connected to diaphragm 23.

Referring now to Figs. 5 through 8, it will be noted that the switch is externally identical in appearance to the form previously described. The interior arrangement, however, is different in several details. The base 58 is provided with an inlet union 59 communicating with a recess 60 in the upper surface of the base plate. A first diaphragm 61 is welded or clamped over said recess 60 and provided with the usual backing plate, the arrangement being similar to diaphragm 15 in Fig. 1. A body member 62 of the switch is provided with a central upwardly dished recess 63 in its lower face providing for upward movement of the diaphragm 61, and with a downwardly dished recess 64. A central passage 65 connects recesses 63 and 64. A first lateral passage 66 (Fig. 6) extends from passage 65 and is provided with a counterbore in which a metering valve 67 is located.

A second lateral passage 68 (Fig. 7) extending from the central passage 65 is provided with a counterbore in which check valve 69 is mounted.

Both the metering valve and check valve are arranged similarly to metering valve 39 and check valve 30 previously described with reference to Fig. 2.

A second diaphragm 70 formed as a thin flat plate is clamped across recess 64 by a pressure plate 71 and machine screws 72 screwed into threaded bores in the body member 62.

The pressure plate is upwardly dished over the second diaphragm 70 to provide a space 71a and is provided with a tubular upwardly extending hub 73.

One contact member of a switch is formed by a stud 74 mounted on the center of diaphragm 70 and the second contact member of the switch is mounted on a stem 75 adjustably mounted in hub 73.

The pressure plate 71 is mounted in a central recess 76 in the upper surface of the body member, the space above the clamping plate being placed in communication with the space 71a above the second diaphragm 70 by a passage 77.

Passage 78 (Fig. 6) leads upwardly from the passage 66 controlled by the metering valve 67 through the body member 62 and pressure plate 71 into recess 76 and a passage 79 (Fig. 7) leads similarly from behind the ball of the check valve 69 to recess 76.

A third diaphragm 80 similar to diaphragm 61 is mounted over recess 76 and clamped to member 62 by a clamping plate 81 and clamping bolts 82 passing through bores in the clamping plate 81 and body 62 into threaded bores in the base member 58.

The device is enclosed by a cover 83 provided with an electrical socket 84a in which are mounted two terminals 85, a lead 86 from one terminal being grounded on plate 81, and a lead 87 from the other terminal being connected as shown in Fig. 6 to the second or intermediate diaphragm 70.

Figure 8:
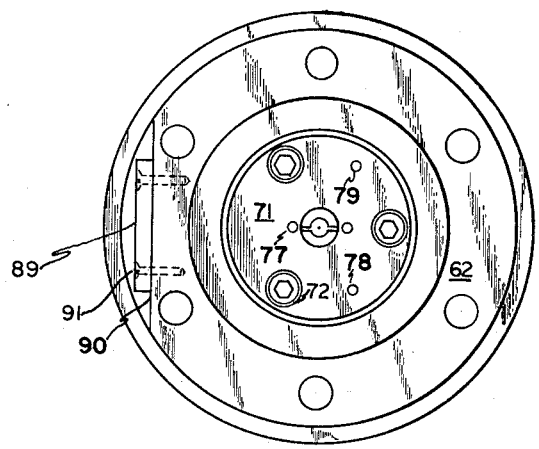
Fig. 8 is a plan view of the switch shown in Fig. 5 with the cover removed.
Figure 7:
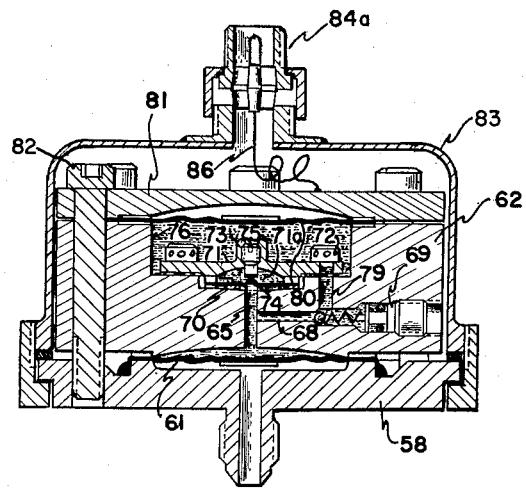
Fig. 7 is a section on the line 7—7 of Fig. 5.

As shown in Figs. 6 and 8 the lead 87 is connected through a passage 88 closed by a plate 89 clamped against a flat 90 machined on body 62 by screws 91. A fluid-tight lead-in construction, generally indicated at 92, is provided to prevent leakage of oil from passage 88 since oil may reach this passage from recess 76.

The spaces between the first and third diaphragms and all other communicating spaces and passages are filled with silicone oil, appropriate seals being clamped between the various engaging surfaces, a housing being thus provided for the switch elements.

In initially assembling the switches the various components are placed in position from the base up, omitting, however, the check valves and covers, and clamped together by tightening up the clamping bolts. The partially assembled switch can then be placed on its side in a vacuum chamber and a suitable oil such as a silicone oil run into the switch through the mounting hole for the check valve to a predetermined level, and the check valve put in place. The assembly can then be completed by connecting the electrical leads. Adjustment of the switch as required can then be made by connecting the pressure union to a source of adjustable pressure and adjusting the metering orifice needle valve to secure breaking of the circuit through the contacts when the pressure drop is at a more rapid rate than that for which the switch is to be set.

Figure 2:
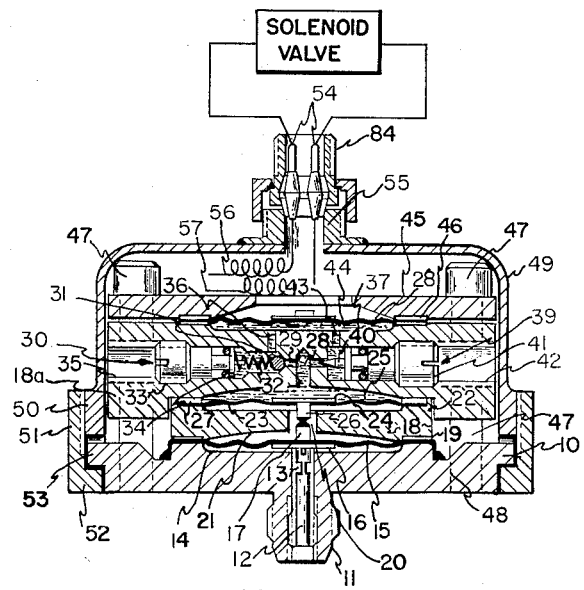
Fig. 2 is a section taken on the line 2—2 in Fig. 1.
Figure 3:
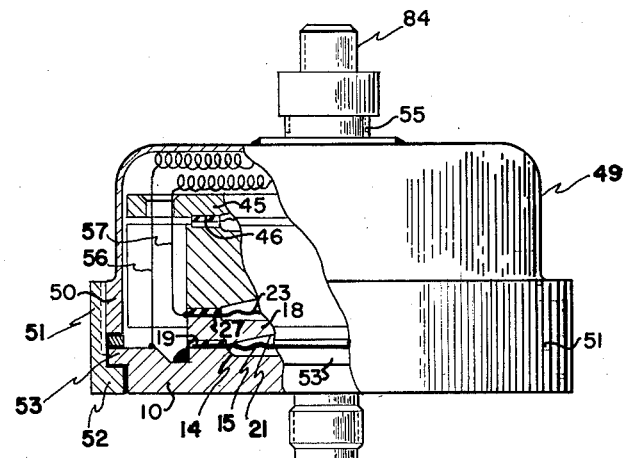
Fig. 3 is a side elevation of the switch shown in Fig. 1 partly broken away to show interior parts.
Figure 4:
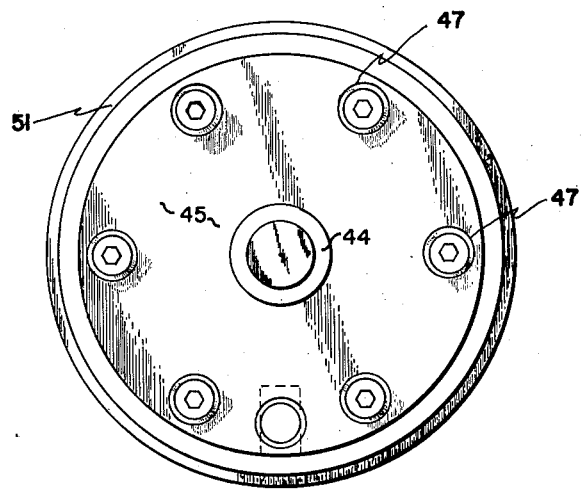
Fig. 4 is a plan view of the switch with the cover removed.

In the form of the invention shown in Fig. 1 and also in the form shown in Fig. 2, it is to be understood that the switch is in direct connection with the pressure in the combustion space by connection to a conduit or port to which the union 11 is connected. In the form of the switch shown in Figs. 1 to 4, as the pressure in the combustion space fluctuates, the more rapid and smaller of which will have little effect on the valve because of the smoothing effect of the restrictor orifice 13, the resultant fluctuations within the pressure range for which the valve is set will, however, be transmitted through diaphragm 15, contacts 17 and 26, and diaphragm 23 to the oil sealed between the diaphragms 23 and 44, the oil surging readily past the ball check valve 30 in one direction but being controlled in its flow in the opposite direction by the needle 40 of the metering valve 39 in the only path open to the liquid. The provision for easy flow of liquid in response to increase of pressure reduces wear between the contact points 17 and 26 of the switch to a minimum.

If pressure in recess 14 falls very rapidly as it would in the case of sudden termination of combustion, the diaphragm 15 bows downwardly faster than diaphragm 23 since the volume of oil required to bow it downwardly can only be imposed at a restricted rate. Contacts would therefore open, breaking the circuit through the valve and giving any type of signal required, for instance by the de-energization of a solenoid which works against a spring to keep open a valve which will operate to immediately shut off the valve on de-energization of the solenoid.

In the form of the invention shown in Figs. 1 through 4 the limiting regression rate is varied by adjusting the pre-load between the contacts by the amount of oil fed into the switch, and by adjustment of the metering orifice.

In the embodiment of the invention shown in Figs. 5 through 8, the limiting regression rate is varied by adjustment of the threaded stem 75 of the second contact to secure loading on the contacts by deflection of plate 70, and by adjustment of the metering valve 67. The contact movement is more limited than in the previously described form of the invention since one contact is immovable and plate 70 is accordingly made stiff enough to require the maximum drop in pressure to occur, before the contacts separate, such maximum pressure drop resulting in substantially complete withdrawal of oil from the recess under the plate 70, while the plate is loaded with oil still present in the space above its upper face under the pressure exerted by diaphragm 80.

Fluctuations of pressure within the predetermined limits causes oil to surge back and forth through the check valve 69 and metering valve 67 without removing support from the underside of plate 70.

In both forms of the invention the diaphragm next to the inlet connection acts as the prime mover of the oil enclosed in the switch assembly and in both forms of the switch the diaphragm nearest the electrical connector is stressed when the amount of oil present under it is increased and thus exerts a force to return the oil when pressure regressions occur during normal variations of pressure in normal functioning of the device to which the switch is connected.

It will be seen that as the pressure level decreases there will be less displacement of oil and therefore since the loading diaphragm exerts less force return flow will be slower, thus causing decrease in the limit in a regression rate.

By arranging the ball check valve to close on pressure decrease on the diaphragm acting as prime mover and open on pressure increase, and arranging the contacts to open under excess pressure decrease, the switch will function to give a signal on the occurrence of such excess in rate decrease.

It is to be noted that either form of the switch may be mounted in any position since the oil is positively sealed between the diaphragms and responds to forces acting on the diaphragms and not on gravity flow of the oil.

The diaphragms described herein are resiliently yieldable members.

While preferred embodiments of the invention have been specifically described and shown in the drawings, it is to be understood that various changes may be made in the described embodiments by those skilled in the art without departing from the scope of the invention as defined by the appended claims.

We claim:

1. A device for monitoring fluid pressure fluctuation comprising: a first and a second resiliently yieldable member enclosing a body of fluid in said device, one of said members being subjected to the fluctuating pressure being monitored; conduit means through which the enclosed fluid is moved in accordance with displacements thereof caused by said resiliently yieldable member subjected to fluctuating pressure; a third resiliently yieldable member subject to the fluctuations in pressure of the body of fluid enclosed by the first and second members; valve means monitoring flow of fluid through said conduit means; means for adjusting said valve means to limit free to-and-fro flow of the fluid through said conduit means to a predetermined rate of fluctuation; and a pair of cooperating means, at least one of which is mounted on said third resiliently yieldable member, and the other of which is arranged so that relative movement of said co-operating means on the occurrence of fluctuations in pressure at a rate different from that for which the valve means have been set is effective to give a signal indicating departure from said rate of the fluid pressure being monitored.

2. A device to monitor fluid pressure fluctuation to give an indication of an excess rate of regression in pressure thereof, comprising: a body structure having a first chamber; a first flexible diaphragm mounted in said chamber; an inlet passage placing one side of said diaphragm under the fluid pressure being monitored; a second chamber containing a second flexible diaphragm; means effective to transmit movements of the first diaphragm to said second diaphragm; a third chamber closed by a third flexible diaphragm; passages connecting said chambers; a body of fluid resiliently sealed in said body by two of said diaphragms but flowing through said passages under the force produced by the fluctuation of said first diaphragm; valve means monitoring flow of fluid through said passages and set to a predetermined rate of flow on regression of pressure but to permit free flow of fluid on increase of pressure, regression of pressure above said rate being effective to cause movement of said second diaphragm at a rate different to that of the first diaphragm; and means operated by the movement of said second diaphragm caused by said higher rate of regression of pressure effective to give an indication of said excess rate of pressure regression in the pressure being monitored.

3. A device as set forth in claim 2 and comprising: an electrical contact member mounted on the first diaphragm and a contact mounted on the second diaphragm, said contact members normally abutting each other, the movement of said first diaphragm being transmitted to the second diaphragm through said contacts; a body of fluid sealed between said second and third diaphragms and in the passages connecting the portions of said chambers in which liquid is sealed by the diaphragms mounted therein; an electrical circuit maintained through the abutment with each other of said contacts while said first and second diaphragms move substantially in unison, the opening of said contacts when the second diaphragm moves at a different rate than the first interrupting said circuit and being effective to give an indication of the existence of an excess rate of regression in pressure in said fluid being monitored by the device.

4. A device as set forth in claim 2 and in which said valve means comprise a check valve structure to ensure free flow of liquid through a passage connecting the second chamber to the third chamber to the third diaphragm on increase of pressure; but to close said passage on regression of pressure and a flow monitoring valve positioned in another passage connecting said second and third diaphragm chambers to control the flow of fluid from said third diaphragm on regression of pressure.

5. A device as set forth in claim 2 and in which said body of fluid is sealed in the body structure between said second and third diaphragms.

6. A device as set forth in claim 2 and in which said body of fluid is sealed in the body structure between said second and third diaphragms; passage means between the chambers in which said second and third diaphragms are mounted; a check valve in said passage means enabling fluid to flow freely from the second into the third chamber in response to an increase in pressure exerted by the first diaphragm; adjustable flow monitoring valve means mounted in said passage means, and permitting free flow of fluid from the second to third chamber on inward movement of the second diaphragm, but restricting the flow of fluid from the third to the second chamber to a predetermined rate on outward movement of the second diaphragm on a regression of pressure acting on the first diaphragm, the setting of said monitoring valve permitting the second and first diaphragms to move substantially in unison when rate of regression in pressure is less than at a maximum for which said monitoring valve is set; contacts mounted on said first and second diaphragms and held in abutting relation by said diaphragms while the diaphragms move in unison in response to fluctuations of a regression rate less than that for which the monitoring valve is set; and an electric circuit completed through said contacts, said circuit being broken by separation of the contacts when the second diaphragm is unable, due to the action of the monitoring valve, to accurately follow the movement of the first diaphragm when regression of pressure occurs at a higher rate than that for which the valve means is set.

7. A device to monitor regression in fluid pressure fluctuation comprising: a body structure having a first chamber; a first flexible diaphragm mounted in said chamber; an inlet passage placing one side of said diaphragm under the fluid pressure being monitored; a second chamber; a plate-like diaphragm mounted in said second chamber; a first contact member mounted on said plate-like diaphragm; a second contact member cooperating with the first contact member and adjustably mounted in the body structure; a third chamber closed by a third diaphragm; passageways connecting the first chamber to one side of the plate-like diaphragm in the second chamber, and connecting the first chamber to the third chamber and the third chamber to the opposite side of the diaphragm in the second chamber; a body of liquid filling said chambers and passageways and sealed therein by the first and third diaphragms; valve means controlling the flow of liquid through said passageways and set to permit the contacts carried by the plate-like diaphragm to remain in contact with its cooperative contact when fluctuations in the rate of regression of pressure in the fluid under the force exerted by the first diaphragm remain below the predetermined rate for which the valve means are set, but causing deflection of the plate-like diaphragm and separation of said contact should the rate of regression in pressure exceed the predetermined rate for which the valve is set; and an electrical circuit carried through said contacts, interuption of said circuit by separation of said contacts being effective to give an indication that an excessive rate of regression of pressure exists in the fluid pressure being monitored.

8. A device as set forth in claim 7 and in which said valve means comprise an adjustable flow monitoring valve positioned to control the flow of fluid in a passage connecting the chamber in which the first diaphragm is mounted to the chamber in which the third diaphragm is mounted; and a check valve in one of said passages enabling fluid to flow freely in response to an increase in pressure exerted by said first diaphragm from said first chamber to said third chamber, but forcing said fluid to flow through the flow monitoring valve in the reverse direction on a regression in the pressure exerted by said first diaphragm.

References Cited in the file of this patent

UNITED STATES PATENTS

| | | |
|---|---|---|
| 1,957,697 | Conway | May 8, 1934 |
| 2,450,961 | Heymann et al. | Oct. 12, 1948 |